Feb. 23, 1943.  E. R. FITZGERALD  2,312,087
REFRIGERATING APPARATUS
Filed March 8, 1941
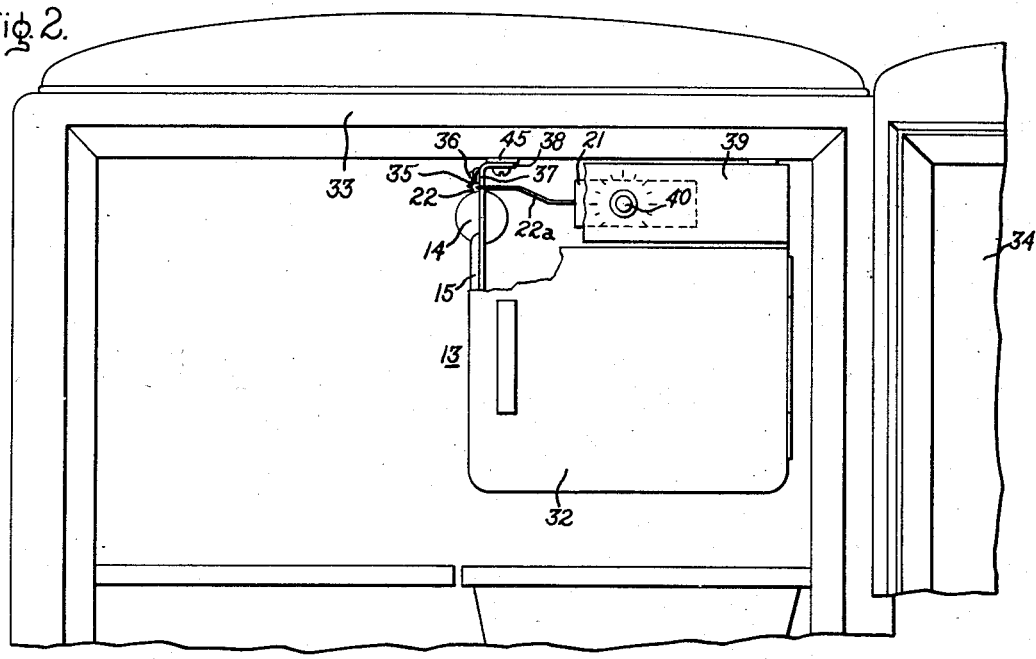
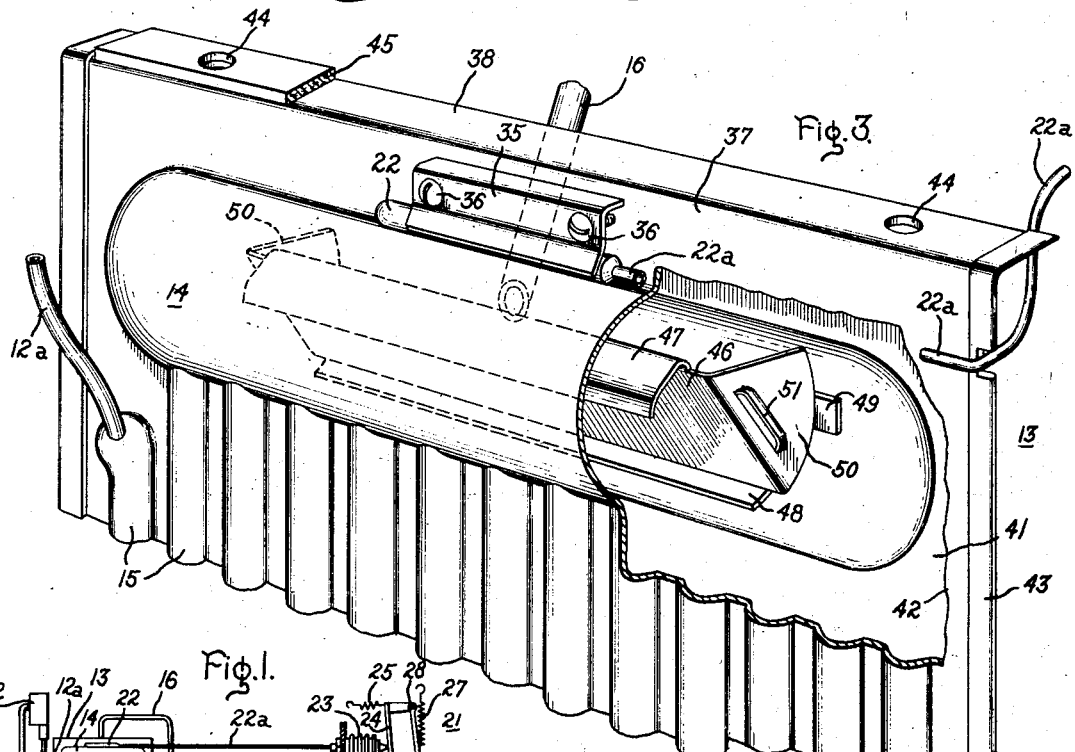
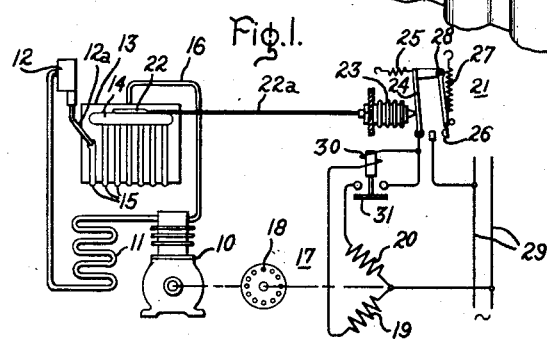
Inventor:
Edward R. Fitzgerald,
by Harry E. Dunham
His Attorney.

Patented Feb. 23, 1943

2,312,087

UNITED STATES PATENT OFFICE 2,312,087

REFRIGERATING APPARATUS

Edward R. Fitzgerald, Schenectady, N. Y., assignor to General Electric Company, a corporation of New York Application March 8, 1941, Serial No. 382,415

1 Claim. (Cl. 62—8)

My invention relates to refrigerating apparatus and particularly to devices for controlling the operation of such apparatus.

Refrigerating machines constructed for the preservation of food-stuffs commonly comprise a thermally insulated cabinet provided with a storage compartment and a cooling unit or evaporator in the upper portion of the compartment. The cooling unit when arranged in the upper portion of the compartment induces a circulation of air throughout the compartment and maintains the articles stored therein within a predetermined desired range of temperatures. It is common practice to control the refrigerating machine to maintain a predetermined range of temperatures of the evaporator or cooling unit, this range of temperatures being selected so that the range of box air temperatures resulting therefrom will be satisfactory for the preservation of food within the compartment. By controlling the cooling unit in this manner, it is possible to maintain temperatures below freezing suitable for the freezing of ice desserts and the like in the cooling unit while maintaining the cabinet air temperature above freezing.

The ability of a refrigerating machine to maintain a predetermined desired temperature of the air in a compartment to be cooled varies with changes in the temperature of the air surrounding the cabinet; the higher the temperature of the air outside the cabinet, the greater is the amount of heat which passes through the cabinet walls to the air within the food compartment and the lower is the required evaporator temperature. Various devices have been designed to provide a control of the refrigerating machine which will vary the operation of the normal control to determine the evaporator temperature in accordance with changes in the temperature of the air outside the compartment.

It is an object of my invention to provide a refrigerating apparatus including an improved control for maintaining a predetermined desired range of temperatures within a refrigerating compartment.

It is another object of my invention to provide a simple and improved device for controlling the cooling unit of a refrigerating machine to vary the effective capacity of the unit in accordance with changes in the temperature of the air within the compartment to be cooled.

Further objects and advantages of my invention will become apparent as the following description proceeds, and the features of novelty which characterize my invention will be pointed out with particularity in the claim annexed to and forming a part of this specification.

For a better understanding of my invention reference may be had to the accompanying drawing in which Fig. 1 is a diagrammatic view of a refrigerating machine provided with a control embodying my invention; Fig. 2 is an enlarged front elevation view of the evaporator shown in Fig. 1 arranged in a household refrigerating cabinet, and Fig. 3 is an enlarged perspective view of a portion of the evaporator shown in Fig. 2 partly broken away to show the inside of the header.

In general, the refrigerating apparatus shown in the drawing comprises a refrigerant compressor, a condenser, and an evaporator connected in a closed refrigerant circuit. The compressor is driven by an alternating current motor, the operation of which is controlled in accordance with the temperature prevailing on the surface of the evaporator immediately above the header where the temperature responsive element of the control is secured. The position of the control bulb on the evaporator is such that the temperature of the bulb depends not only on the temperature of the evaporator but also on the temperature of the air circulating in the upper portion of the refrigerated compartment.

Referring now to the drawing, in Fig. 1 I have shown a refrigerating machine comprising a compressor 10 arranged to deliver compressed refrigerant to a condenser 11 in which the refrigerant is cooled and liquefied. Liquid refrigerant is supplied from the condenser 11 through a float valve or other flow controlling device 12 and a liquid line 12a to an evaporator or cooling unit 13. The cooling unit 13 is a sheet metal structure provided with a header 14 and a plurality of dependent liquid circulating conduits 15. The liquid refrigerant in the evaporator 13 is vaporized by the absorption of heat from the air surrounding the evaporator and from articles placed within the evaporator and the vaporized refrigerant is separated from the liquid in the header 14 and is withdrawn from the evaporator through a suction line 16 and is returned to the compressor. The compressor is driven by an alternating current electric motor 17 comprising a squirrel-cage induction rotor 18 and a suitable stator including a running winding 19 and a starting winding 20. The operation of the motor 17 is controlled by a temperature responsive switch 21 having a thermal element 22 secured to the evaporator 13. The thermal element 22 comprises a bulb partially filled with a vaporizable liquid and arranged to actuate a bellows 23 to which it is connected by a tube 22a in the usual manner. The bellows 23 is arranged to move an arm 24 against the force of the spring 25 and to actuate a movable contact 26 of the control 21. The contact 26 is moved with snap action by operation of an over-center spring 27. When the temperature in the evaporator rises above a predetermined value, the bellows 23 expands and moves a pivot point 28 of the switch over the center line of the spring 27 thereby snapping the movable contact 26 into its closed position and closing the circuit from one side of alternating current supply lines 29 through a relay coil 30 and the starting winding 19 to the other side of the supply lines. The coil 30 picks up an armature raising a contact bridging arm 31 and closing the circuit of the starting winding 20, thereby connecting the starting and running windings in parallel across the supply lines. The starting winding is a split-phase winding which acts with the running winding 19 to produce a rotating field and starts the rotation of the squirrel-cage rotor 18 thereby starting the compressor. As the speed of the motor increases, the current flowing in the windings is reduced and as full speed is approached, the armature of the solenoid 30 drops out thereby disconnecting the starting winding. The motor then continues to operate as a single-phase induction motor. When the temperature of the freezing portion of the evaporator has been reduced to its predetermined lower limit, the bellows 23 contracts sufficiently to allow the spring 25 to draw the pivot 28 over center thereby snapping the contact 26 to its open position and stopping the operation of the motor.

In order that the operation of the refrigerating machine shall maintain the evaporator temperature within its required range and also maintain the temperature of the air in the compartment to be cooled within a predetermined range, the bulb 22 of the thermostatic control is secured to the evaporator in a position such that its temperature depends not only on the temperature of the evaporator but also on the temperature of the air circulating in the upper portion of the compartment to be cooled. This arrangement of the thermal element 22 is clearly shown in Figs. 2 and 3. In Fig. 2 I have shown the evaporator 13 provided with a door 32 and arranged in the upper portion of a thermally insulated cabinet 33 having an insulated door 34. The bulb 22 is secured in good thermal contact with the evaporator by a clamp 35 secured in place by screws 36 so that the bulb 22 is clamped against the header 14 and adjacent an upright portion 37 of the vertical wall of the evaporator above the header. The wall 37 is bent to form a flange 38 by which the evaporator is secured to the top of the cabinet. The control 21 is mounted adjacent the top of the evaporator on a suitable panel 39 and is provided with an adjusting knob 40 which is connected in the usual manner (not shown in the drawing) to vary the effective force of the spring 25.

As clearly shown in Fig. 3 the evaporator 13 is composed of two sheet metal portions 41 and 42 secured together in face engagement and provided with suitable indentations forming the liquid refrigerant circulating conduits 15 and the two halves of the cylindrical header 14. The sheet metal portion 41 is bent around the edges of a sheet 42 as indicated at 43 and the two sheets are secured together around their edges and between the passages 15 and around the header by welding or in any other suitable manner. The flange 38 at the top of the vertical wall of the evaporator is provided with suitable holes 44 so that the evaporator may be secured to the top wall of the refrigerator cabinet. A strip of cork or other insulating material 45 is placed between the flange 38 and the top wall of the refrigerator.

The upright portion of the evaporator wall above the header 14 is in the path of relatively warm air circulating through the upper portion of the compartment to be cooled and its temperature tends to vary with the changes in the temperature of the air. During the operation of the evaporator 13 liquid refrigerant is maintained above the ends of the conduits 15 to a level approximately half filling the header, and due to the absorption of heat the liquid refrigerant boils and the vapor passes up through the conduits to the surface of the liquid in the header. In order to prevent the splashing of refrigerant in and around the suction line 16 which communicates with the evaporator within the upper portion of the header, there is provided a baffle 46 extending longitudinally within the header at an angle between the upper ends of the conduit passages 15 and the opening of the suction line 16, the baffle being secured in place by suitable upper and lower flanges 47 and 48, respectively, and by tabs 49 on end walls 50. The end walls 50 are provided with narrow upwardly extending slots 51 which provide communication between the header and the space within the baffle both above and below the level of liquid refrigerant in the header. The baffle 46 prevents the splashing of liquid refrigerant against the top of the header within the confines of the baffle; and I arrange the bulb 22 immediately above the baffle so that liquid refrigerant is not splashed against the wall of the evaporator adjacent the bulb; and the bulb is therefore not subject to fluctuations of temperature due to the splashing of refrigerant in its vicinity.

I prefer to construct the evaporator of stainless steel which is a material of relatively low thermal conductivity as compared with other metals such as copper and aluminum. The flow of heat through the wall of the evaporator is therefore impeded and since the bulb 22 is arranged in a position such that liquid refrigerant can not strike the wall of the evaporator immediately adjacent the bulb, there is a substantial drop or gradient in temperature from the wall 37 around the header of the evaporator to the portion of the header in contact with liquid refrigerant. The bulb 22 is therefore responsive to a temperature which is intermediate that of the wall 37 and the coldest or freezing portion of the evaporator and this temperature is influenced by the rise of temperature of the air flowing over the wall 37 and the temperature of the liquid refrigerant in the evaporator; it follows that should the temperature of the air in the cabinet rise and thereby increase the temperature of the wall 37, the evaporator will operate until its temperature is reduced sufficiently to overcome this rise of temperature and cool the bulb 22 to the temperature at which it will shut off the refrigerating machine.

The arrangement of the temperature responsive bulb and of the header of the evaporator in the manner just described makes it possible to provide compensation for varying box air temperatures without the necessity of complicated controls or any additional control mechanisms, and it is readily apparent that I have provided a simple and effective control device for refrigerating apparatus whereby the predetermined range of temperatures in the compartment to be cooled may be maintained regardless of changes of temperature outside the compartment.

While I have described my invention in connection with a household refrigerator, other applications will be apparent to those skilled in the art; I do not, therefore, desire my invention to be limited to the particular construction shown and described and I intend in the appended claim to cover all modifications within the spirit and scope of my invention.

What I claim as new and desire to secure by Letters Patent of the United States is:

A refrigerating machine including a cabinet having a compartment to be cooled, an evaporator arranged in the upper portion of said compartment for cooling the air therein and for providing a freezing portion, said evaporator comprising walls constructed of a metal of low thermal conductivity and formed to provide a header and a depending refrigerant circulating conduit therein, said wall having an upright portion above said header for securing said evaporator in said compartment, baffling means arranged within said header for providing a quiet zone of liquid refrigerant therein, means for supplying refrigerant to and for withdrawing refrigerant from said evaporator, and a control means including a temperature responsive element secured to said evaporator adjacent said upright wall and immediately above said quiet zone for controlling the operation of said refrigerant supplying and withdrawing means, the operation of said evaporator providing a substantial gradient between the temperature of said upright portion and the temperature of said freezing portion, the temperature of said element lying along said gradient intermediate said temperatures whereby said control provides operation of said evaporator to maintain the temperature thereof sufficiently low to compensate for increases in the temperature of the air in said compartment.

EDWARD R. FITZGERALD.